(12) United States Patent
Sabolcik

(10) Patent No.: US 10,832,559 B2
(45) Date of Patent: Nov. 10, 2020

(54) COMMUNICATION HUB FOR EMERGENCY RESPONDERS

(71) Applicant: SCOTT TECHNOLOGIES, INC., Monroe, NC (US)

(72) Inventor: Michael Scott Sabolcik, Waxhaw, NC (US)

(73) Assignee: Scott Technologies, Inc., Monroe, NC (US)

( * ) Notice: Subject to any disclaimer, the term of this patent is extended or adjusted under 35 U.S.C. 154(b) by 0 days.

(21) Appl. No.: 15/773,697

(22) PCT Filed: Nov. 9, 2016

(86) PCT No.: PCT/US2016/061090
§ 371 (c)(1),
(2) Date: May 4, 2018

(87) PCT Pub. No.: WO2017/083355
PCT Pub. Date: May 18, 2017

(65) Prior Publication Data
US 2018/0330601 A1    Nov. 15, 2018

Related U.S. Application Data

(60) Provisional application No. 62/252,758, filed on Nov. 9, 2015.

(51) Int. Cl.
*H04M 11/04* (2006.01)
*G08B 27/00* (2006.01)
(Continued)

(52) U.S. Cl.
CPC ......... *G08B 27/001* (2013.01); *G08B 25/009* (2013.01); *G08B 27/005* (2013.01);
(Continued)

(58) Field of Classification Search
CPC .. G08B 27/001; G08B 27/005; G08B 27/006; H04W 4/38; H04W 4/90; H04W 84/18; H04W 4/029; H04W 4/40; H01Q 1/32
(Continued)

(56) References Cited

U.S. PATENT DOCUMENTS 7,508,840 B2 *   3/2009   Delaney ................ H04W 92/02
                                                           370/466
7,598,850 B2 *  10/2009   Manz ................... G08B 27/005
                                                           340/506
(Continued)

FOREIGN PATENT DOCUMENTS

CN        201946089       8/2011
RU           129284       6/2013

OTHER PUBLICATIONS

International Search report for PCT International Application No. PCT/US2016/061090 dated Mar. 6, 2017, 2 pages.
Extended Search Report for EP Patent Application No. EP 16864894, dated May 7, 2019 (3 pages).

*Primary Examiner* — Khoi H Tran
*Assistant Examiner* — B M M Hannan

(57) ABSTRACT

A method, communication hub and mesh network for facilitating management of emergency responders and emergency response equipment via a communication hub are disclosed. According to one aspect, the communication hub includes at least one telemetry radio configured to communicate with emergency response equipment to gather data from the emergency response equipment. The communication hub also includes at least one 802.11-compliant radio configured to transmit the gathered data to at least one wireless device configured to manage the emergency responders and emergency response equipment.

16 Claims, 5 Drawing Sheets

(51) Int. Cl.

| | |
|---|---|
| *G08B 25/00* | (2006.01) |
| *H04W 4/38* | (2018.01) |
| *H04W 4/029* | (2018.01) |
| *H04W 4/90* | (2018.01) |
| *H04W 4/40* | (2018.01) |
| *H01Q 1/32* | (2006.01) |
| *H04W 84/18* | (2009.01) |
| *G08B 29/16* | (2006.01) |
| *G08B 25/14* | (2006.01) |

(52) U.S. Cl.
CPC ............ *G08B 27/006* (2013.01); *H01Q 1/32* (2013.01); *H04W 4/029* (2018.02); *H04W 4/38* (2018.02); *H04W 4/40* (2018.02); *H04W 4/90* (2018.02); *H04W 84/18* (2013.01); *G08B 25/14* (2013.01); *G08B 29/16* (2013.01)

(58) Field of Classification Search
USPC ..................................................... 455/404.1
See application file for complete search history.

(56) References Cited

U.S. PATENT DOCUMENTS

| | | | | |
|---|---|---|---|---|
| 9,161,195 | B1* | 10/2015 | Nix | H04W 4/90 |
| 9,852,599 | B1* | 12/2017 | Slavin | H04W 4/90 |
| 9,871,673 | B2* | 1/2018 | Muetzel | H04L 12/46 |
| 2002/0103622 | A1* | 8/2002 | Burge | G07C 5/008 |
| | | | | 702/183 |
| 2007/0120671 | A1 | 5/2007 | Carmichael | |
| 2008/0137589 | A1 | 6/2008 | Barrett | |
| 2009/0033499 | A1 | 2/2009 | Malik | |
| 2009/0267756 | A1* | 10/2009 | Denny | G08G 1/205 |
| | | | | 340/521 |
| 2009/0313748 | A1 | 12/2009 | Guedes | |
| 2010/0265935 | A1* | 10/2010 | Okada | H04W 84/18 |
| | | | | 370/350 |
| 2015/0206419 | A1* | 7/2015 | Johnson | G08B 25/009 |
| | | | | 340/936 |
| 2015/0334545 | A1* | 11/2015 | Maier | H04W 4/025 |
| | | | | 455/404.2 |

* cited by examiner

COMMUNICATION HUB FOR EMERGENCY RESPONDERS

CROSS REFERENCE TO RELATED APPLICATIONS

This application is a national stage filing under 35 U.S.C. 371 of PCT/US2016/061090, filed Nov. 9, 2016, which claims the benefit of US Provisional Patent Application No. 62/252758, filed Nov. 9, 2015, the disclosures of which are incorporated by reference in their entirety herein.

TECHNICAL FIELD

The present disclosure relates to communication systems for emergency responders.

BACKGROUND

Incident commanders and/or other emergency services personnel (emergency responders) may receive telemetry from emergency responders present at an emergency incident scene, such as a fire, natural disaster, and/or other hazardous environment. The telemetry is typically transmitted from the emergency responders to a base station, which may be remote from or present at the emergency incident scene and which may include incident command software that assists ranking emergency responders in managing an emergency incident scene. For example, a dedicated laptop computer may be transported to the emergency incident scene (e.g., by a battalion commander, a fire chief, a firefighter, a medic, a physician, and/or other emergency responders) to serve as a base station for gathering telemetry from the emergency responders. Examples of telemetry that may be gathered from the emergency responders include, but are not limited to, self-contained breathing apparatus (SCBA) data, personal alarm safety system (PASS) data, motion sensor data, heads up display (HUD) data from a HUD of a firefighter or other emergency services personnel, video data from a video camera, thermal imaging camera data from a thermal imaging camera, location data of emergency services personnel (e.g., global positioning system (GPS) data), sensor data (e.g., biometric data of an emergency responder, environmental data, other device and/or equipment data, and/or the like).

At least some known base stations gather telemetry from emergency responders at an emergency incident scene using radios (e.g., universal serial bus (USB) based radios, Personal Computer Memory Card International Association (PCMCIA) based radios, and/or the like) incorporated into the base station and the emergency services equipment carried by the emergency services personnel (e.g., gear, a rig, SCBAs, cameras, PASSes, HUDs, air tanks, GPS and/or other type of location beacons, sensors, and/or the like). But, radios have a limited range and therefore telemetry cannot be gathered or recorded until a base station having the required radio (e.g., a dedicated laptop computer and/or the like) has arrived at the emergency incident scene (e.g., until the arrival of a command vehicle that carries an incident commander in possession of the radio-enabled base station). Accordingly, as emergency incident scenes often evolve rapidly, the incident scene may be over and/or a point of no return may be reached by the time the radio-enabled base station arrives.

Cellular networks (e.g., cellular Internet and/or the like) have been proposed for transmitting telemetry from emergency responders at an emergency incident scene to a remote or on-scene base station, for example to a cloud-based storage. But, cellular connectivity is not available in some areas. Moreover, many emergency incidents impair or disable local cellular connectivity. Accordingly, cellular networks may not be reliable for gathering telemetry from emergency responders at an emergency incident scene.

SUMMARY

Embodiments advantageously provide a method, a communication hub and a mesh network for facilitating management of emergency responders and emergency response equipment via a communication hub. According to one aspect, the communication hub includes at least one telemetry radio configured to communicate with emergency response equipment to gather data from the emergency response equipment. The communication hub also includes at least one 802.11-compliant radio to facilitate management of the emergency responders and emergency response equipment.

According to this aspect, in some embodiments, the communication hub further includes a memory configured to store the gathered data. In some embodiments, the communication hub further includes a cellular radio configured to transmit the gathered data to a remote location via a cellular communication network. In some embodiments, at least one cellular radio provides access to the Internet. In some embodiments, the communication hub may further include circuitry configured to facilitate communication between the communication hub and at least one other communication hub to form a mesh network. In some embodiments, the processing circuitry is further configured to detect the presence of another communication hub and receive data gathered by the another communication hub from emergency response equipment. In some embodiments, the gathered data includes data from a breathing apparatus wearable by an emergency responder. In some embodiments, the gathered data includes a position of an emergency responder. In some embodiments, the communication hub includes hardware to mount the communication hub on an emergency response vehicle.

According to another aspect, a method for providing a data network for emergency responders is provided. The data network includes a communication hub installable on an emergency response vehicle. The method includes providing a communication hub, the communication hub including at least one telemetry radio configured to communicate with emergency response equipment to gather data from the emergency response equipment and at least one 802.11-compliant radio configured to communicate with at least one wireless device to facilitate management of the emergency responders and emergency response equipment. The method also includes gathering, via the at least one radio, data from the emergency response equipment. The method also includes transmitting via the 802.11-compliant radio the gathered data to at least one wireless device to facilitate management of the emergency responders and emergency response equipment.

According to this aspect, in some embodiments, the method also includes storing the gathered data at the communication hub. In some embodiments, the method further includes transmitting the data to a remote location via a cellular communication network. In some embodiments, the method further includes providing a connection between the communication hub and the Internet. In some embodiments, the method further includes linking the communication hub with at least one other communication hub to form a mesh network. In some embodiments, the gathered data includes data from a breathing apparatus wearable by an emergency responder. In some embodiments, the gathered data includes a position of an emergency responder. In some embodiments, hardware is included to mount the communication hub to an emergency response vehicle.

According to another aspect, an emergency response mesh network configured to facilitate management of emergency responders and emergency response equipment is provided. The emergency response mesh network includes a first communication hub that includes a first radio in communication with emergency response equipment and configured to gather data from the emergency response equipment and a 802.11-compliant radio in communication with at least one wireless device configured to manage an emergency response, the 802.11-compliant radio configured to transmit the gathered data to the at least one wireless device. The network also includes a second communication hub in communication with the first communication hub and comprising at least a second radio in communication with emergency response equipment and configured to gather data from the emergency response equipment.

According to this aspect, in some embodiments, the first communication hub is in communication with a first set of emergency response equipment and the second communication hub is in communication with a second set of emergency response equipment different from the first set. In some embodiments, the second communication hub shares data gathered from the second set of emergency response equipment with the first communication hub. In some embodiments, the second communication hub is in communication with the Internet. In some embodiments, the second communication hub executes a discovery process to sense the presence of the first communication hub. In some embodiments, communication between (a) at least one of the first communication hub and the second communication hub communication hub and (b) emergency response equipment is bi-directional. In some embodiments, the first communication hub and the second communication hub include hardware to enable mounting the first communication hub and the second communication hub on respective emergency response vehicles.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
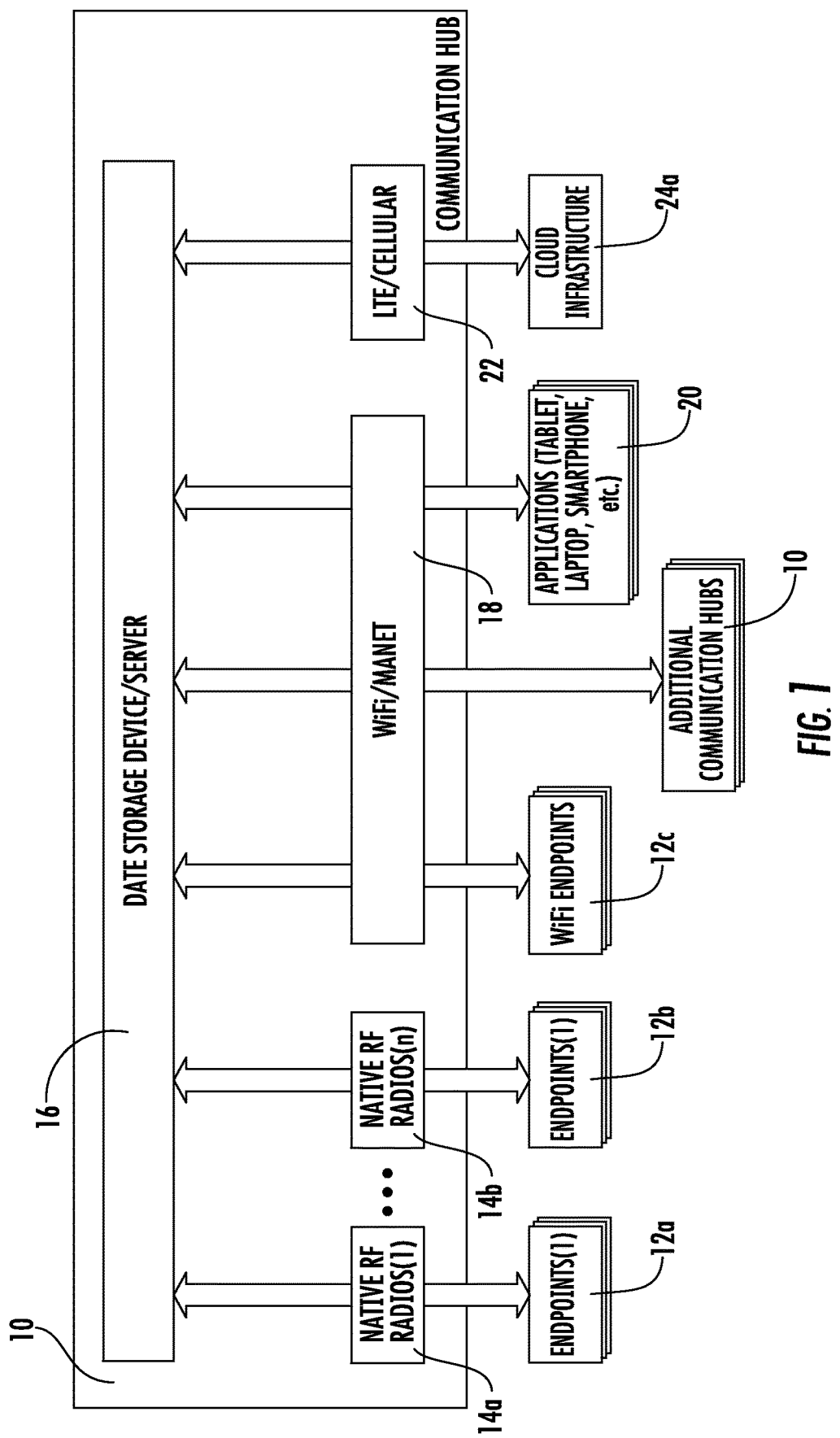
FIG. 1 is a block diagram of an embodiment of a communication hub for emergency services use.

Before describing in detail exemplary embodiments, it is noted that the embodiments reside primarily in combinations of apparatus components and processing steps related to communication systems for emergency responders. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, a communication hub is configured to be installed on an emergency response vehicle (e.g., ambulance, fire truck, etc.). The communication hub includes a plurality of telemetry receiving radios, a wireless (Wi-Fi) router configured to provide a wireless (Wi-Fi) access point, and optionally a plurality of cellular Internet radios to provide Internet connectivity.

In an embodiment, a method for providing a data network for emergency responders includes providing the emergency responders with a communication hub installable in an emergency response vehicle. Each communication hub includes a wireless router, such as an IEEE 802.11 compliant router, e.g., a Wi-Fi router, configured to provide a wireless access point. The method also includes gathering telemetry data from emergency response equipment carried by the emergency responders using the communication hubs. The method also includes forwarding the gathered telemetry data to at least one wireless device to facilitate management of emergency response equipment and emergency responders.

Figure 2:
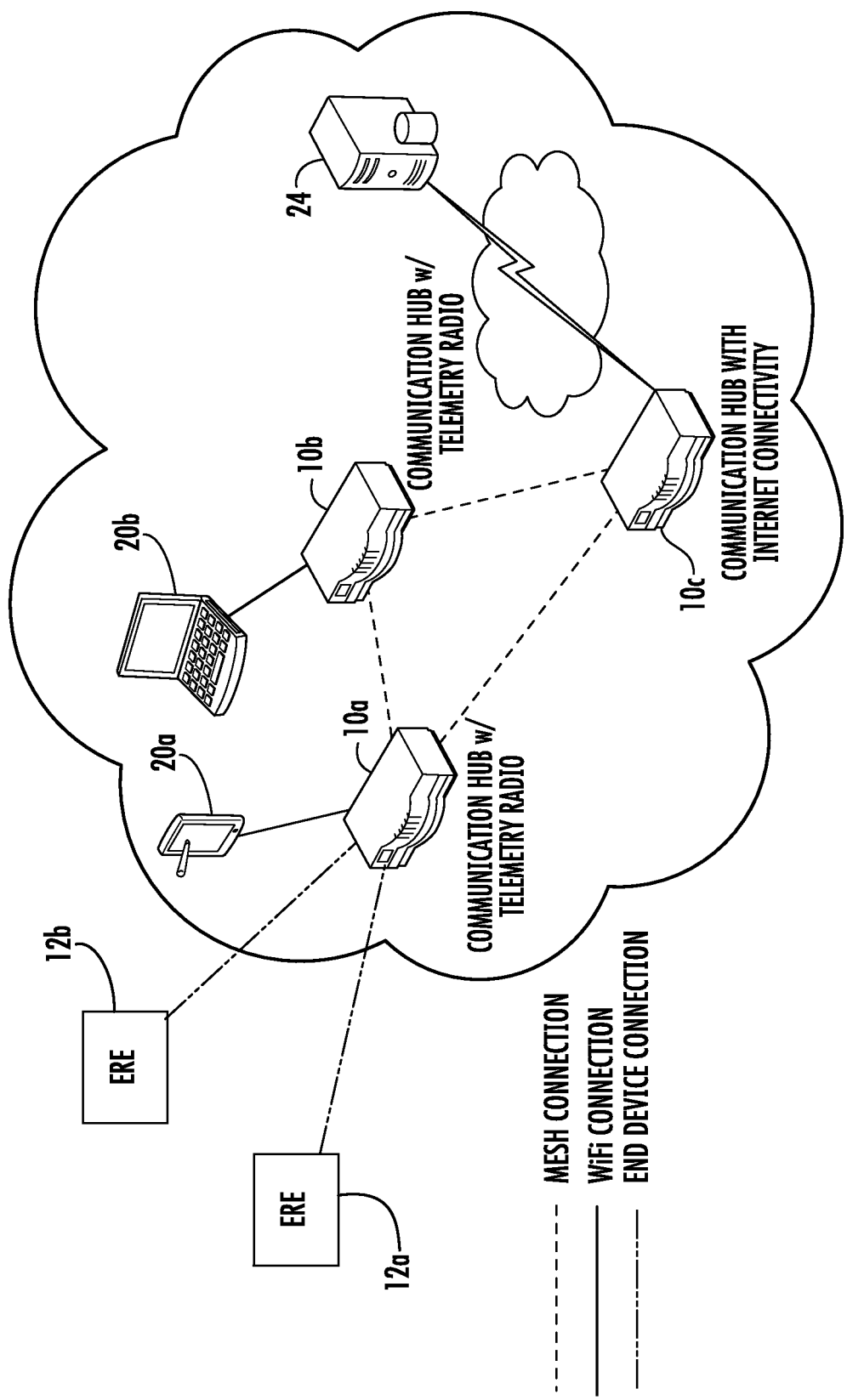
FIG. 2 is a schematic diagram of an embodiment of data network provided using one or more of the communication hubs.

FIG. 1 is a block diagram of an embodiment of a communication hub 10 installed on an emergency response vehicle. FIG. 2 is a schematic diagram of an embodiment of a data network provided using one or more communication hubs 10a, 10b and 10c, referred to collectively herein as communication hubs 10. Each communication hub 10 is configured to be installed on an emergency response vehicle dispatched to an emergency incident scene, such as, but not limited to, a fire, natural disaster, and/or other hazardous materials release response. Thus, the communication hub may include hardware so that the communication hub 10 is mountable to the emergency response vehicle such as the fire engine. In some embodiments, the first communication hub (10a) and the second communication hub (10b) include hardware to enable mounting the first communication hub (10a) and the second communication hub (10b) on respective fire engines. Each emergency responder carries emergency response equipment 12a, 12b and 12c, referred to collectively herein as emergency response equipment (ERE) 12. ERE 12 may include one or more of a self-contained breathing apparatus (SCBA), a personal alarm safety system (PASS), a motion sensor, a heads up display (HUD), a video camera, a thermal imaging camera, a location beacon (e.g., a global positioning (GPS) beacon and/or the like), a sensor (e.g., a biometric sensor, an environmental sensor, other device and/or equipment sensors, other data generating devices, and/or the like). The emergency response equipment 12 and/or the communication hub 10 may form a portion of and/or be carried by a rig of an emergency responder, such as, but limited to, a firefighter apparatus that is configured to be worn by a firefighter and/or the like.

Although the embodiments described and/or illustrated herein are described and illustrated with respect to emergency responders, the communication hubs 10 described and/or illustrated herein additionally or alternatively may be used with emergency response equipment (not shown) present at the emergency incident scene but not carried by an emergency responder, such as, but not limited to, robots, remote control vehicles, drop sensors, drop beacons, drop repeaters, drop cameras, and/or the like. Also, although FIGS. 1 and 2 show a specific number of hubs 10 and emergency response equipments 12, it is understood that implementations are not limited to the quantities depicted in the figures. Any suitable quantities of hubs 10 and emergency response equipments 12 can be used depending on scope and design requirements.

As will be described below, each communication hub 10 may be configured to: (1) form a mesh network with one or more other communication hubs 10; (2) act as a wireless (Wi-Fi) access point; and/or (3) receive telemetry from one or more components of emergency response equipment 12.

In FIGS. 1 and 2, the communication hubs 10 communicate with the emergency response equipment 12 carried by the emergency responders using telemetry radios 14 (such as, but not limited to, universal serial bus (USB) based radios, Personal Computer Memory Card International Association (PCMCIA) based radios, and/or the like). For example, the communication hubs 10 may receive telemetry and/or other data from the emergency response equipment 12 using the telemetry radios 14a, and 14b referred to collectively herein as telemetry radios 14. But, in other embodiments, one or more of the communication hubs 10 communicates with one or more components of the emergency response equipment 12 using a wired connection. The communication between the communication hubs 10 and the emergency response equipment 12 may be bidirectional. Although FIG. 1 shows a specific number of telemetry radios 14, it is understood that implementations are not limited to the quantity depicted in the figure. Any suitable quantities of telemetry radios 14 can be used depending on scope and design requirements. In some embodiment, a telemetry radio may be an 802.11 compliant radio.

The communication hubs 10 are configured to gather telemetry from the emergency response equipment 12. As shown in FIG. 1, each communication hub 10 includes a data storage device/server 16 for storing onboard the communication hub 10 telemetry data gathered from the emergency response equipment 12 that are carried by the emergency responders. As will be described below, the data storage device/server 16 may also be used to store telemetry from emergency response equipment 12 that are associated with other communication hubs 10. The data storage device/server 16 may include any type of data storage device, such as, but not limited to, a server, a flash memory, a hard disk memory, and/or the like. In some embodiments, the data storage device/server 16 includes a server.

As shown in FIG. 1, each communication hub 10 includes a wireless communication radio such as an Institute of Electrical and Electronic Engineers standard IEEE 802.11-compliant Wi-Fi radio 18 that is configured to provide a Wi-Fi access point. Accordingly, each communication hub 10 is configured to provide a Wi-Fi network at the emergency incident scene. The communication hubs 10 are therefore configured to provide Wi-Fi access points to a shared (i.e., common) Wi-Fi data network at the emergency incident scene. Wi-Fi radios are sometimes referred to as Wi-Fi routers or Wi-Fi access radios. Of note, although the embodiments described herein are described with reference to Wi-Fi and IEEE 802.11-compliant devices, it is understood that embodiments are not limited solely to these implementations. It is contemplated that any wireless communication technology that is based on standardized non-licensed spectrum can be used in connection with what is described with reference to Wi-Fi radio 18.

Each communication hub 10 is configured to act as a Wi-Fi access point for one or more wireless devices 20a and 20b, referred to collectively herein as wireless devices 20 (such as, but not limited to, a smartphone, a tablet computer, a laptop computer, and/or other wireless devices) using the Wi-Fi radio 18 thereof. In other words, the access points provided by the Wi-Fi radio 18 enable wireless devices 20 to connect to a Wi-Fi data network provided by the communication hub(s) 10 present at the emergency incident scene. Using the Wi-Fi data network, the wireless device(s) 20 thus may be used as one or more base stations for managing the emergency incident scene. For example, the wireless device(s) 20 may include incident command software that assists in managing the emergency incident scene. Moreover, and for example, telemetry and/or other data gathered from the emergency response equipment 12 may be transmitted to the wireless device(s) 20 using the Wi-Fi access point(s) provided by the communication hub(s) 10 to assist in managing the emergency incident scene. When multiple communication hubs 10 are present at the emergency incident scene, a wireless device 20 may connect to any available communication hub 10 to send telemetry and/or other data. For example, in some embodiments, a wireless device 20 may connect to any communication hub 10 using the Wi-Fi data network and receive all information that is being generated at the emergency incident scene. Although reference is made to the Wi-Fi radio standard, other radio standards may be employed to connect the communication hub 10 to wireless devices 20.

The Wi-Fi radios 18 allow communication hubs 10a, 10b and 10c to form a mobile ad-hoc mesh network (MANET) for communication of telemetry and/or other data between communication hubs 10 (i.e., inter-hub communication). The Wi-Fi radios 18 may automatically accommodate communication hubs 10 joining and leaving the Wi-Fi data network without compromising data communication or integrity. The data storage device/server 16 of each communication hub 10 may include "middleware" for the exchange of information between emergency response equipment 12, communication hubs 10, wireless devices 20, and/or other devices connected to the Wi-Fi data network (such as, but not limited to, cloud based services, Internet connected devices, and/or the like). The middleware may support bidirectional communication between emergency response equipment 12, communication hubs 10, wireless devices 20, and/or other devices connected to the Wi-Fi data network. The middleware may include a network discovery mechanism that allows applications running on the wireless devices 20 to identify and connect to communication hubs 10 available on the Wi-Fi data network and subscribe to middleware topics.

The Wi-Fi radios 18 may be IEEE 802.11 wireless radios. In other words, the Wi-Fi radios 18 may be compatible with the IEEE 802.11 wireless standard. Using the 802.11 standard allows both a mesh and standard infrastructure network to operate simultaneously on the same radio. Any wireless devices 20 that are 802.11 compliant have the option of connecting to the Wi-Fi network as a mesh node or a non-mesh device. To non-802.11 compliant electronic devices 20, the Wi-Fi network appears as a standard access point.

Optionally, one or more of the communication hubs 10 includes a cellular radio 22 configured to provide cellular connectivity (e.g., a cellular Internet connection such as, but not limited to, 3G, 4G, LTE). The cellular connectivity enables the communication hubs 10 to provide Internet access to emergency response equipment 12, communication hubs 10, wireless devices 20, and/or other devices (e.g., the exemplary cloud device 24 shown in FIGS. 1 and 2) connected to the Wi-Fi data network. The cellular connectivity also enables the communication hubs 10 to provide data transmission to a cloud based service and/or to provide an Internet hot spot for emergency response equipment 12, communication hubs 10, wireless devices 20, and/or other devices connected to the Wi-Fi data network. For example, telemetry and/or other data gathered from the emergency response equipment 12 may be transmitted to the cloud based service for off-scene access (e.g., display and/or the like), later access, logging, and/or the like.

The embodiments of the communication hubs 10 described and/or illustrated herein enables off the shelf electronic devices (such as, but not limited to, smartphones, computer tablets, laptop computers, and/or the like) to receive incident information and telemetry from devices that are not Wi-Fi based (e.g., emergency response equipment 12 such as, but not limited to, SCBAs, thermal Imaging Cameras, and/or the like) with minimal configuration of the device and without the need for additional radios attached to the device. Additionally, information can be gathered and forwarded to a cloud based solution without user intervention. So long as the communication hub 10 is powered the communication hub 10 will collect information from the emergency response equipment 12 and store the information for use by applications on-scene, and/or send the information to a cloud based system for logging and/or off-scene use.

The embodiments of the communication hubs 10 described and/or illustrated herein may be less expensive, easier to set up, capable of being set up in less time, and/or the like as compared to at least some known Wi-Fi networks that are manually created at an emergency incident scene.

Thus, a communication hub 10 with the functionality described here may be installed on each of a plurality of emergency response vehicles. Each communication hub 10 may include a Wi-Fi radio and telemetry receiving radios. The Wi-Fi radio would serve a three-fold purpose:
1. It would be used to form a mesh network between the hubs for communication of telemetry.
2. It would act as a Wi-Fi access point for devices on scene to run Incident Command or other applications.
3. It could be used to receive telemetry from Wi-Fi based devices.

When multiple communication hubs 10 are present on a scene, an end device could connect to any available communication hub to send telemetry. A communication hub 10 can contain a cellular Internet connection (3G/4G/LTE) to communicate data to a cloud service for off-scene access.

Mobile ad-hoc networking would allow the communication hubs 10 to form a mesh network and also allow other devices such as tablets, PCs and smart phones to connect to the mesh network. Using IEEE standard 802.11s as a model allows both a mesh and standard infrastructure network to operate simultaneously on the same radio. IEEE 802.11s-compliant devices have the option of connecting as a mesh node or a non-mesh device. To non-IEEE 802.11s Wi-Fi devices, the network looks like a standard access point.

The communication hub 10 allows off the shelf devices (tablets, smartphones) to receive incident information and telemetry from devices that are not Wi-Fi based (i.e. SCBA, Thermal Imaging Cameras, etc.) with minimal configuration of the device and without the need for additional radios attached to the device. Additionally, information can be gathered and forwarded to the cloud based solution without user intervention. So long as the hub is powered it will collect information from the end devices and store it for use by applications on-scene, as well as sending that information to the cloud based system for logging or off-scene use.

Figure 3:
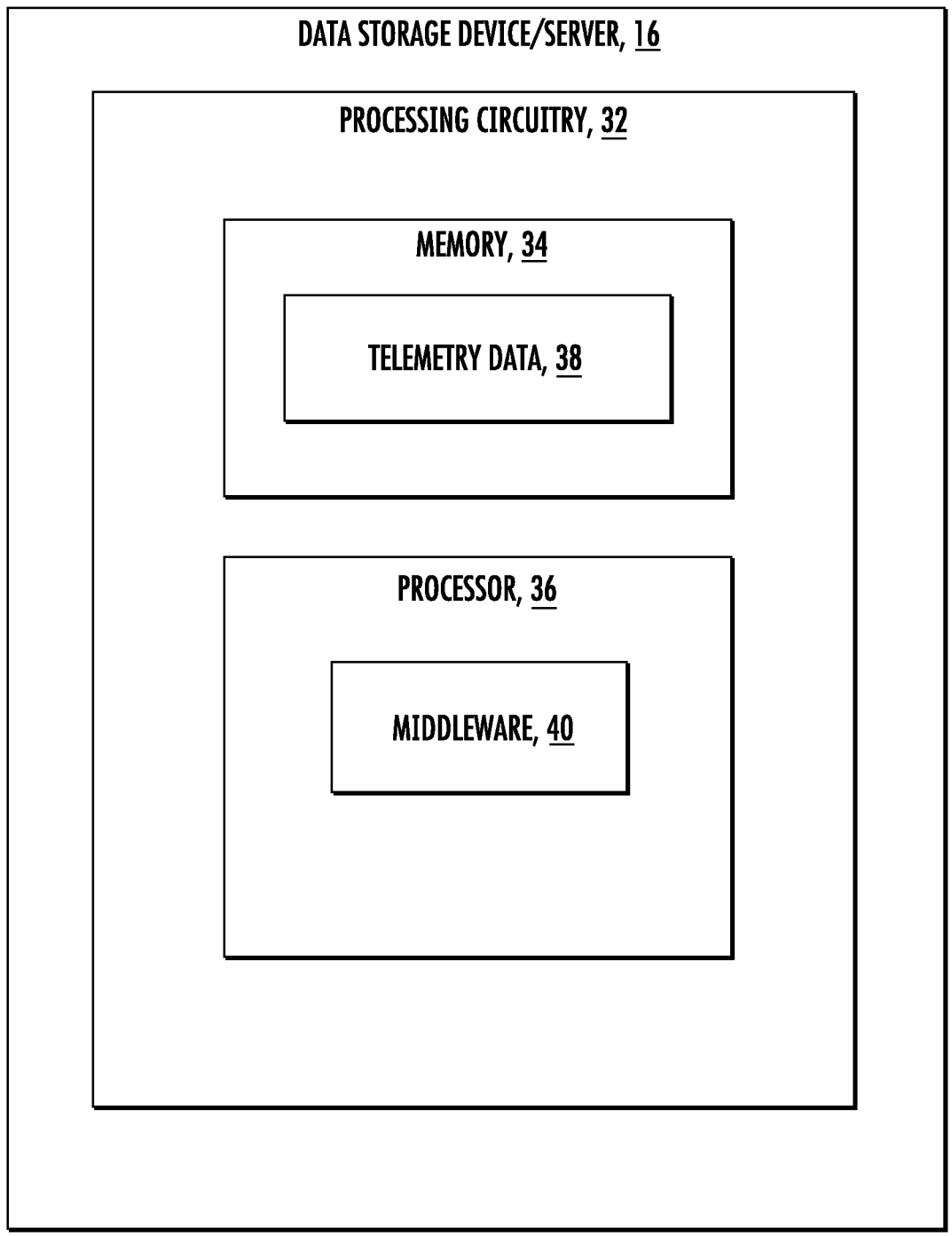
FIG. 3 is a block diagram of a data storage device/server of a communication hub.

FIG. 3 is a block diagram of a data storage device/server 16 constructed to store and exchange telemetry data between communication hubs 10. The server 16 has processing circuitry 32. In some embodiments, the processing circuitry may include a memory 34 and processor 36, the memory 34 containing instructions which, when executed by the processor 36, configure processor 36 to perform the one or more functions described herein. In addition to a traditional processor and memory, processing circuitry 32 may include integrated circuitry for processing and/or control, e.g., one or more processors and/or processor cores and/or FPGAs (Field Programmable Gate Array) and/or ASICs (Application Specific Integrated Circuitry).

Processing circuitry 32 may comprise and/or be connected to and/or be configured for accessing (e.g., writing to and/or reading from) memory 34, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by control circuitry and/or other data, e.g., data pertaining to communication, e.g., configuration and/or address data of nodes, etc. Processing circuitry 32 may be configured to control any of the methods described herein and/or to cause such methods to be performed, e.g., by processor 36. Corresponding instructions may be stored in the memory 34, which may be readable and/or readably connected to the processing circuitry 32. In other words, processing circuitry 32 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be configured to be accessible for reading and/or writing by the controller and/or processing circuitry 32.

In one embodiment, the memory 34 is configured to store telemetry data 38 from the communication hub of which the server 16 is a part as well as from other communication hubs from which telemetry data is gathered by the execution of middleware 40.

Figure 4:
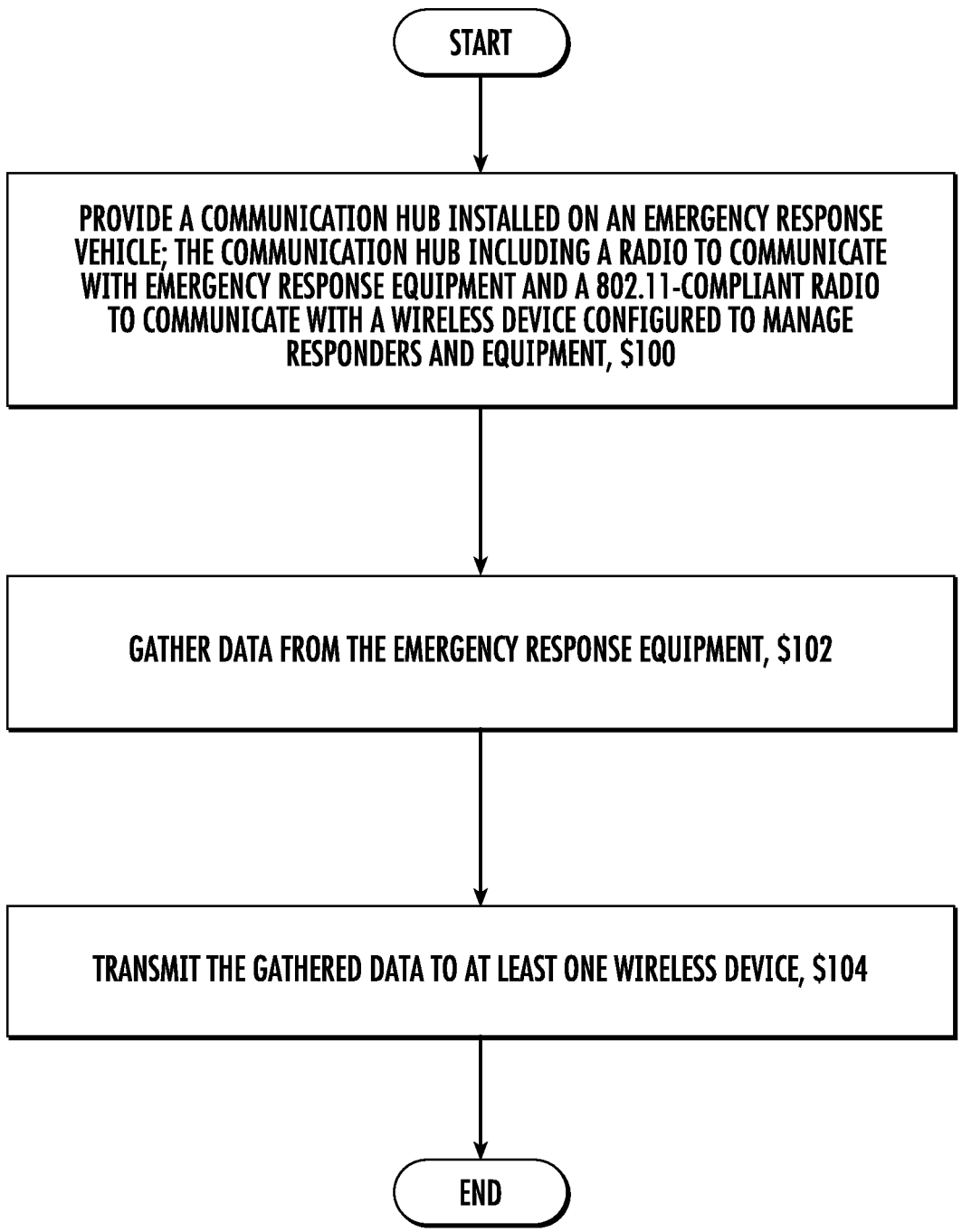
FIG. 4 is flowchart of an exemplary process for providing a data network for emergency responders.

FIG. 4 is a flowchart of an exemplary process for providing a data network for emergency responders. The process includes providing a communication hub 10 installed on an emergency response vehicle, the communication hub 10 including a first radio to communicate with emergency response equipment 12 and including a Wi-Fi radio 18 to communicate with a wireless device 20 configured to manage emergency responders and emergency response equipment 12 (block S100). The process also includes gathering data via the communication hub 10 from the emergency response equipment 12 (block S102). The gathered data may be transmitted to at least one wireless device 20 (block S104).

Figure 5:
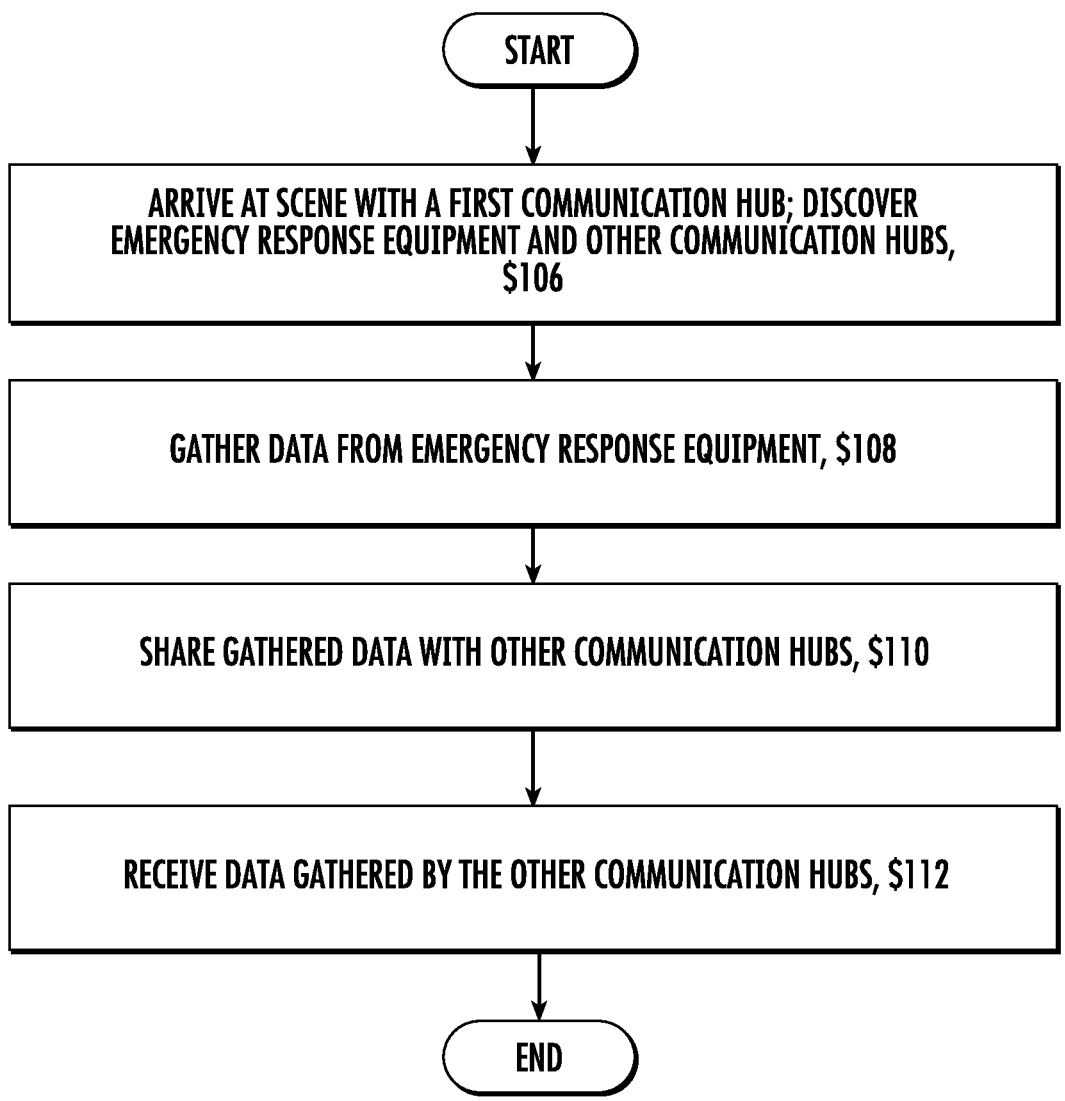
FIG. 5 is a flowchart of an exemplary process for using a mesh network of communication hubs.

FIG. 5 is a flowchart of an exemplary process for using a mesh network of communication hubs 10a, 10b and 10c. The process includes, when an emergency response vehicle having a first communication hub 10a arrives on an emergency incident scene, discovering via the first communication hub 10a any other communication hubs 10b and 10c on the scene and discovering emergency response equipment at the scene within communication range of the first communication hub (block S106). The process includes gathering data from the emergency response equipment 12 discovered by the first communication hub 10a (block S108). The first communication hub 10a shares the gathered data with other communication hubs in the vicinity (block S110). Conversely, the first communication hub 10a may also receive data gathered from other emergency response equipment 12 by the other communication hubs (block S112).

According to one aspect, the communication hub 10a includes at least one telemetry radio 14 configured to communicate with emergency response equipment 12 to gather data from the emergency response equipment 12. The communication hub 10a also includes at least one 802.11-compliant radio 18 to facilitate management of the emergency responders 20 and emergency response equipment 12.

According to this aspect, in some embodiments, the communication hub further includes a memory 34 configured to store the gathered data. In some embodiments, the communication hub further includes a cellular radio 22 configured to transmit the gathered data to a remote location via a cellular communication network. In some embodiments, at least one 802.11-compliant radio 18 provides access to the Internet. In some embodiments, the communication hub may further include circuitry (32) configured to facilitate communication between the communication hub (10a) and at least one other communication hub (10b) to form a mesh network. In some embodiments, the processing circuitry (32) is further configured to detect the presence of another communication hub (10b) and receive data gathered by the other communication hub (10b) from emergency response equipment (12). In some embodiments, the gathered data includes data from a breathing apparatus wearable by an emergency responder. In some embodiments, the gathered data includes a position of an emergency responder. In some embodiments, the communication hub includes hardware to mount the communication hub (10a) on a fire engine.

According to another aspect, a method for providing a data network for emergency responders is provided. The data network includes a communication hub (10a) installable on an emergency response vehicle. The method includes providing (block S100) the communication hub (10a), the communication hub (10a) including at least one telemetry radio (14) configured to communicate with emergency response equipment (12) to gather data (block S102) from the emergency response equipment (12) and at least one 802.11-compliant radio (18) to facilitate management of the emergency responders and emergency response equipment (12). The method also includes gathering (block S104), via the at least one telemetry radio (14), data from the emergency response equipment (12). The method also includes transmitting via 802.11 compliant radio (18) the gathered data to at least one wireless device (20) to facilitate management of the emergency responders and emergency response equipment (12).

According to this aspect, in some embodiments, the method also includes storing the gathered data at the communication hub (10a). In some embodiments, the method further includes transmitting the data to a remote location via a cellular communication network. In some embodiments, the method further includes providing a connection between the communication hub (10a) and the Internet (24). In some embodiments, the method further includes linking the communication hub (10a) with another communication hub (10b) to form a mesh network. In some embodiments, the gathered data includes data from a breathing apparatus wearable by an emergency responder. In some embodiments, the gathered data includes a position of an emergency responder. In some embodiments, a communication hub is mountable to a fire engine.

According to another aspect, an emergency response mesh network configured to facilitate management of emergency responders and emergency response equipment (12) is provided. The emergency response mesh network includes a first communication hub (10a) that includes a first radio (14a) in communication with emergency response equipment (12) and configured to gather data from the emergency response equipment (12), and a 802.11-compliant radio (18) in communication with at least one wireless device (20) configured to manage an emergency response, the 802.11-compliant radio (18) configured to transmit the gathered data to the at least one wireless device (20). The network also includes a second communication hub (10b) in communication with the first communication hub (10a) and including at least a second radio (14b) in communication with emergency response equipment (12) and configured to gather data from the emergency response equipment (12).

According to this aspect, in some embodiments, the first communication hub (10a) is in communication with a first set of emergency response equipment (12a) and the second communication hub (10b) is in communication with a second set of emergency response equipment (12b) different from the first set (12a). In some embodiments, the second communication hub (10b) shares data gathered from the second set of emergency response equipment (12b) with the first communication hub (10a). In some embodiments, the second communication hub is in communication with the Internet. In some embodiments, the second communication hub (10b) executes a discovery process to sense the presence of the first communication hub (10a). In some embodiments, communication between (a) at least one of the first communication hub (10a) and the second communication hub (10b), and (b) the emergency response equipment (12) is bi-directional. In some embodiments, the first communication hub (10a) and the second communication hub (10b) include hardware to enable mounting the first communication hub (10a) and the second communication hub (10b) on respective emergency response vehicles.

Other embodiments include:

Embodiment 1

A communication hub for an emergency services personnel, the communication hub comprising:
a body configured to be installed on equipment typically found at an emergency incident scene; and
a wireless (Wi-Fi) router configured to provide a wireless (Wi-Fi) access point.

Embodiment 2

The communication hub of Embodiment 1, further comprising a data storage device configured to store telemetry gathered by the communications hub from one or more emergency services devices carried by the emergency services personnel.

Embodiment 3

The communication hub of Embodiment 1, further comprising a server configured to store telemetry gathered by the communications hub from one or more emergency services devices carried by the emergency services personnel.

Embodiment 4

The communication hub of Embodiment 1, further comprising one or more telemetry radios for receiving telemetry from one or more emergency services devices carried by the emergency services personnel.

Embodiment 5

The communication hub of Embodiment 1, wherein the body is configured to be installed on equipment typically found at an emergency incident scene.

Embodiment 6

The communication hub of Embodiment 1, wherein the Wi-Fi router is a IEEE 802.11 wireless radio.

Embodiment 7

The communication hub of Embodiment 1, wherein the Wi-Fi router is configured to form a mesh network.

Embodiment 8

The communication hub of Embodiment 1, wherein the Wi-Fi router is configured to act as the Wi-Fi access point for one or more electronic devices.

Embodiment 9

The communication hub of Embodiment 1, wherein the Wi-Fi router is configured to act as the Wi-Fi access point for at least one of a smartphone, a tablet computer, or a laptop computer. 12. The communication hub of claim 1, further comprising a cellular radio configured to provide cellular connectivity for at least one of providing data transmission to a cloud based service or providing an Internet hot spot.

Embodiment 10

A method for providing a data network for emergency services personnel, the method comprising:
providing the emergency services personnel with a communication hub that is installed in equipment typically found at an emergency incident scene, each communication hub comprising a wireless (Wi-Fi) router configured to provide a wireless (Wi-Fi) access point; and
gathering telemetry from emergency services devices carried by the emergency services personnel using the communication hubs;
transmitting the telemetry from the communication hubs to an electronic device using the Wi-Fi access point provided by at least one of the communication hubs.

Embodiment 11

The method of Embodiment 10, further comprising storing telemetry gathered by the communications hubs onboard the communication hubs.

Embodiment 12

The method of Embodiment 10, further comprising providing Internet access using at least one of the Wi-Fi routers.

Embodiment 13

The method of Embodiment 10, further comprising forming a mesh network using the Wi-Fi routers of at least some of the communication hubs.

Embodiment 14

The method of Embodiment 10, wherein the electronic device comprises at least one of a smartphone, a tablet computer, or a laptop computer.

Embodiment 15

The method of Embodiment 10, further comprising providing cellular connectivity using at least one of the communication hubs.

Embodiment 16

The method of Embodiment 10, further comprising providing at least one of data transmission to a cloud based service or an Internet hot spot using at least one of the communication hubs.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A communication hub for installation on an emergency response vehicle to facilitate management of emergency responders and emergency response equipment, the communication hub comprising:
   at least one telemetry radio configured to wirelessly communicate with the emergency response equipment to wirelessly gather telemetry from the emergency response equipment, the wirelessly gathered telemetry including telemetry from a breathing apparatus wearable by an emergency responder that indicates a location of the breathing apparatus;
   at least one 802.11 compliant radio configured to wirelessly transmit the gathered telemetry, without user intervention, to at least one wireless device to facilitate management of the emergency responders and the emergency response equipment; and
   processing circuitry configured to use the at least one telemetry radio and the at least one 802.11 compliant radio to discover emergency response equipment and other communication hubs at an incident scene.

2. The communication hub of claim 1, further comprising a memory to store the gathered telemetry.

3. The communication hub of claim 1, further comprising a cellular radio configured to transmit the gathered telemetry to a remote location via a cellular communication network.

4. The communication hub of claim 3, wherein at least one cellular radio provides access to an internet.

5. The communication hub of claim 1, further comprising processing circuitry configured to facilitate communication between the communication hub and at least one other communication hub to form a mesh network.

6. The communication hub of claim 5, wherein the processing circuitry is further configured to detect a presence of the at least one other communication hub and receive telemetry gathered by the at least one other communication hub from a set of emergency response equipment.

7. The communication hub of claim 1, wherein the gathered telemetry includes a position of an emergency responder.

8. The communication hub of claim 1, further comprising hardware to mount the communication hub on the emergency response vehicle.

9. A method for providing a data network for emergency responders, the data network including a communication hub installable on an emergency response vehicle, the method comprising:
   providing the communication hub, the communication hub comprising:
   at least one telemetry radio configured to wirelessly communicate with emergency response equipment to wirelessly gather telemetry from the emergency response equipment, the wirelessly gathered telemetry including telemetry from a breathing apparatus wearable by an emergency responder that indicates a location of the breathing apparatus; and
   at least one 802.11 compliant radio configured to wirelessly transmit the gathered telemetry, without user intervention, to at least one wireless device to facilitate management of the emergency responders and the emergency response equipment;
   gathering via the at least one telemetry radio the telemetry from the emergency response equipment; and
   transmitting via the at least one 802.11 compliant radio the gathered telemetry to at least one wireless device to facilitate management of the emergency responders and the emergency response equipment; and
   discovering, via the at least one telemetry radio and the at least one 802.11 compliant radio, emergency response equipment and other communication hubs at an incident scene.

10. The method of claim 9, further comprising storing the gathered telemetry at the communication hub.

11. The method of claim 9, further comprising transmitting the telemetry to a remote location via a cellular communication network.

12. The method of claim 9, further comprising providing a connection between the communication hub and an internet.

13. An emergency response mesh network configured to facilitate management of emergency responders and emergency response equipment, the emergency response mesh network comprising:
- a first communication hub comprising;
- a first radio in communication with a first set of emergency response equipment and configured to wirelessly gather telemetry from the first set of emergency response equipment, the wirelessly gathered telemetry including telemetry from a breathing apparatus wearable by an emergency responder that indicates a location of the breathing apparatus; and
- an 802.11 compliant radio in communication with at least one wireless device configured to manage an emergency response, the 802.11 compliant radio configured to wirelessly transmit the gathered telemetry, without user intervention, to the at least one wireless device; and
- processing circuitry configured to use the first radio and the 802.11 compliant radio to discover emergency response equipment and other communication hubs at an incident scene; and
- a second communication hub in communication with the first communication hub and comprising at least a second radio in communication with a second set of emergency response equipment and configured to gather telemetry from the second set of emergency response equipment.

14. The emergency response mesh network of claim 13, wherein the first set of emergency response equipment and the second set of emergency response equipment are different.

15. The emergency response mesh network of claim 14, wherein the second communication hub shares the telemetry gathered from the second set of emergency response equipment with the first communication hub.

16. The emergency response mesh network of claim 13, wherein the second communication hub is in communication with an internet.

* * * * *

UNITED STATES PATENT AND TRADEMARK OFFICE
CERTIFICATE OF CORRECTION

PATENT NO. : 10,832,559 B2
APPLICATION NO. : 15/773697
DATED : November 10, 2020
INVENTOR(S) : Michael Scott Sabolcik Page 1 of 1

It is certified that error appears in the above-identified patent and that said Letters Patent is hereby corrected as shown below:

In the Claims

Column 14
Line 51, in Claim 9, after "equipment;" delete "and".

Column 15
Line 12, in Claim 13, after "apparatus;" delete "and".

Signed and Sealed this
Twenty-ninth Day of December, 2020

Andrei Iancu
*Director of the United States Patent and Trademark Office*